No. 26,274.  PATENTED NOV. 29, 1859.
W. LINTON.
FILTER.
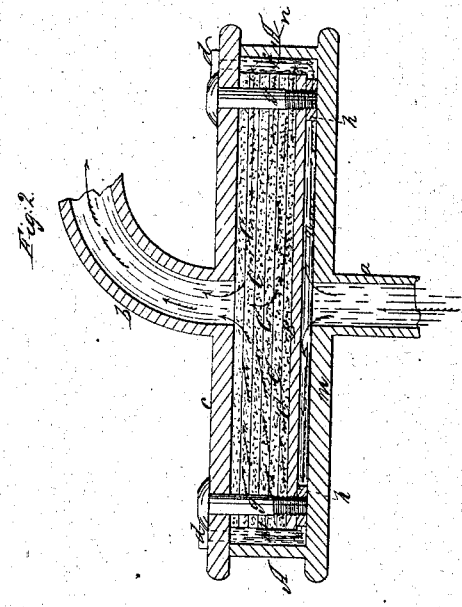
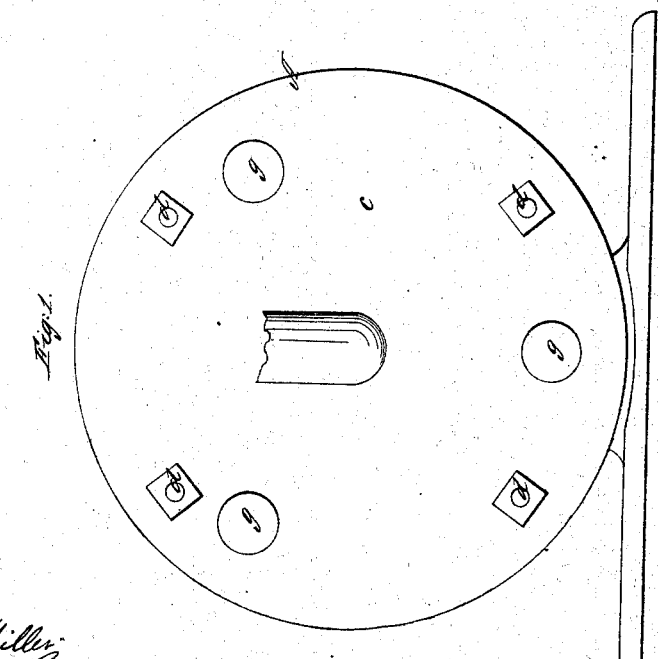
Witnesses:
Edward A. Miller
Geo. W. Fisher
Inventor:
Wm. Linton

UNITED STATES PATENT OFFICE.

WILLIAM LINTON, OF BALTIMORE, MARYLAND.

FILTER.

Specification of Letters Patent No. 26,274, dated November 29, 1859.

*To all whom it may concern:*

Be it known that I, WILLIAM LINTON, of Baltimore, in the State of Maryland, have invented a new and useful Improvement in Filters; and I do hereby declare that the following is a full, clear, and exact description of the same, reference being had to the accompanying drawings, forming a part of this specification, in which—

Figure 1 is a side elevation of a filter with my improvement applied to it. Fig. 2 is a horizontal section of the same.

Similar letters of reference, in each of the several figures indicate corresponding parts.

The nature of my invention consists in arranging a clamping plate B, of less diameter than the filtering cylinder, on adjusting screws $g$, of the removable head $c$, of the cylinder A, in the manner and for the purpose described. By this arrangement, the water is received at one end of the cylinder, caused to change its course and to pass to the circumference of the cylinder, then to take a course, back, through the layers of felt, or similar filtering media, toward the axis of the cylinder and to pass off at the opposite end of the cylinder to that at which it entered. Facilities for compressing the filtering media to suit the condition of the water and for removing and cleansing the filtering media, are thus provided.

To enable others skilled in the art to make and use my invention I will proceed to describe its construction and operation.

A, represents a cylinder made with a receiving pipe $a$, and discharge pipe $b$. The cylinder has a removable head $c$, which is held to the main part of the cylinder by screws $d$, $d$, as shown. This removable head has the discharge pipe attached to it. Within the cylinder a solid adjustable metal disk B, is arranged. This disk screws onto the ends of screws $g$, $g$, $g$, being held in place by nuts $h$. The screws pass through the removable head and butt against the fixed head $m$, of the cylinder A, as shown. It will be observed that the disk B, is set some distance from the fixed head $m$ of the cylinder, and can be adjusted by means of the nuts and screws $g$, and $h$, so as to stand a greater or less distance from the same. The object in thus setting the disk from the head $m$ is that a water space $n$, may exist between the disk and the head $m$. Between the disk B, and the removable head are arranged a series of layers of compressible filtering material C, made of felt or other similar substance. These layers of felt and the disk B, are of smaller diameter than the cylinder in order that a water and face $n^1$, may exist between them and the circumference of the cylinder. By thus arranging the filtering media between the adjustable disk and removable head facilities are afforded for forcing the layers closer together or moving them farther apart so as to suit the character of the water to be filtered, this being accomplished by removing the head $c$, the filtering media C and disk B altogether, and then screwing the nuts $h$, farther on or off the ends of the screws $g$, $g$, $g$.

From the above description of parts it may be evident that if water enters at pipe $a$, it will be spread and have its course changed by the disk B, so that it is caused to pass along the water space $n$, on each side of the axis of the cylinder, and then into the water space $n^1$; and from thence through the filtering media to the discharge pipe $b$—as illustrated in blue color and by the red arrows. Thus circulating the water subjects it to the greatest possible amount of filtering surface, and insures a perfect filtration of the same.

What I claim as my invention and desire to secure by Letters Patent is—

Arranging a clamping plate B, of less diameter than the filtering cylinder on adjusting screws $g$, of the removable head $c$, of the cylinder A, substantially as and for the purposes set forth.

The foregoing specification of my improvement in filters signed and witnessed this second day of July 1859.

WM. LINTON.

Witnesses:
EDWARD A. MILLER,
GEO. W. FISHER.